(12) United States Patent
Ohashi et al.

(10) Patent No.: US 7,151,352 B2
(45) Date of Patent: Dec. 19, 2006

(54) MOTOR CONTROLLER

(75) Inventors: Hironori Ohashi, Narashino (JP); Shinji Yonemoto, Narashino (JP); Yuri Takano, Narashino (JP); Yutaka Matsumoto, Narashino (JP); Hideto Takada, Narashino (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 11/356,107

(22) Filed: Feb. 17, 2006

(65) Prior Publication Data

US 2006/0197484 A1    Sep. 7, 2006

(30) Foreign Application Priority Data

Feb. 21, 2005    (JP) ............................. 2005-043361

(51) Int. Cl.
G05B 11/01    (2006.01)
(52) U.S. Cl. ...................... 318/560; 318/567; 318/569; 318/461
(58) Field of Classification Search ................ 318/560, 318/567, 569, 600, 727, 461, 799
See application file for complete search history.

(56) References Cited

U.S. PATENT DOCUMENTS

| | | | |
|---|---|---|---|
| 4,170,155 A * | 10/1979 | Saito et al. ..................... 83/76 |
| 4,724,732 A * | 2/1988 | Miyauchi et al. ............... 83/37 |
| 5,554,087 A * | 9/1996 | Hwang et al. ................. 483/62 |
| 5,600,221 A | 2/1997 | Tomatsuri |
| 5,850,772 A * | 12/1998 | Hayashi ......................... 83/37 |
| 6,781,339 B1 * | 8/2004 | Ikeguchi ..................... 318/569 |
| 2004/0135532 A1 | 7/2004 | Tomatsuri |

FOREIGN PATENT DOCUMENTS

JP    2002-032127    1/2002

* cited by examiner

*Primary Examiner*—Rina Duda
(74) *Attorney, Agent, or Firm*—Antonelli, Terry, Stout and Kraus, LLP.

(57) ABSTRACT

A motor controller having the electronic cam function that makes it smooth operation even if the number of operation patterns is lessened is provided. The electronic gear function included in a servo-amplifier and a divider are used to vary the gear ratio of an electronic gear in a previously provided ratio in accordance with an external rotation position so that the electronic cam function is realized. The motor controller further includes a program execution unit so that the electronic gear is operated in accordance with programs. Since the electronic gear function and the divider is included in an inexpensive servo-amplifier and is used to realize the electronic cam function, the inexpensive and intelligent system can be realized. Since the divider is provided in the system, the number of data and the reading frequency of the cam pattern can be decreased and accordingly the inexpensive system is realized.

7 Claims, 5 Drawing Sheets

MOTOR CONTROLLER

BACKGROUND OF THE INVENTION

The present invention relates to an apparatus for controlling a motor.

JP-A-2002-32127 discloses the electronic cam function.

In the method disclosed in JP-A-2002-32127, operation patterns for normal rotation and reverse rotation are provided in a motor controller and the operation pattern is read out in synchronism with a clock signal to control the position of the cam so that the electronic cam function is provided. In the method, in order to operate the cam in accordance with the operation pattern by a motor smoothly, it is necessary to speed up the clock signal and provide the operation pattern in detail. Accordingly, it is required to increase the processing speed of the clock signal and increase a memory capacity for storing the operation pattern, so that restriction is imposed on cost, size and so on.

SUMMARY OF THE INVENTION

It is an object of the present invention to provide a motor controller having the electronic cam function that makes it possible to make smooth operation even if the number of operation patterns is lessened.

The present invention is to achieve the above object by electronically controlled gears. The gear ratio of the electronic gears is set by variably controlling the constant of the numerator and the denominator for prescribing the gear ratio of the electronic gears.

Further, the operation pattern is prepared and stored to correspond to the cam pattern. The operation pattern corresponding to the cam pattern has values prescribed at predetermined intervals and values not prescribed at the predetermined intervals are interpolated to prepare the operation pattern and the prepared operation pattern is stored.

Thus, the operation pattern prescribing the cam pattern is roughly prescribed, although since the operation not prescribed by the operation pattern is interpolated, the operation can be made smoothly. Further, since the interpolation operation is made, the memory capacity for storing the cam pattern can be reduced, so that the cam data can be also read out at a low speed.

Moreover, the external position used in control can be divided by a divider to reduce the memory capacity of the cam pattern. Furthermore, since the frequency can be reduced by the division, it is useful to reduce the processing speed of the circuit or software for processing this part, so that the cost of a position controller can be suppressed.

The above processing is performed by program instructions for instructing at least the cam operation control for the processing and a controller for executing the program instructions.

Further, the program instructions may include instructions for instructing operation of operation units in the motor controller such as a position controller, a speed controller and a power converter and the controller for instructing the program instructions may control the operation units in the motor controller such as the position controller, the speed controller and the power converter.

By using the above-mentioned measures, the apparatus can be made small and inexpensive.

According to the present invention, the motor controller having the cam function can be provided with the smaller structure as compared with the conventional one.

Other objects, features and advantages of the invention will become apparent from the following description of the embodiments of the invention taken in conjunction with the accompanying drawings.

DESCRIPTION OF THE EMBODIMENTS

Figure 1:
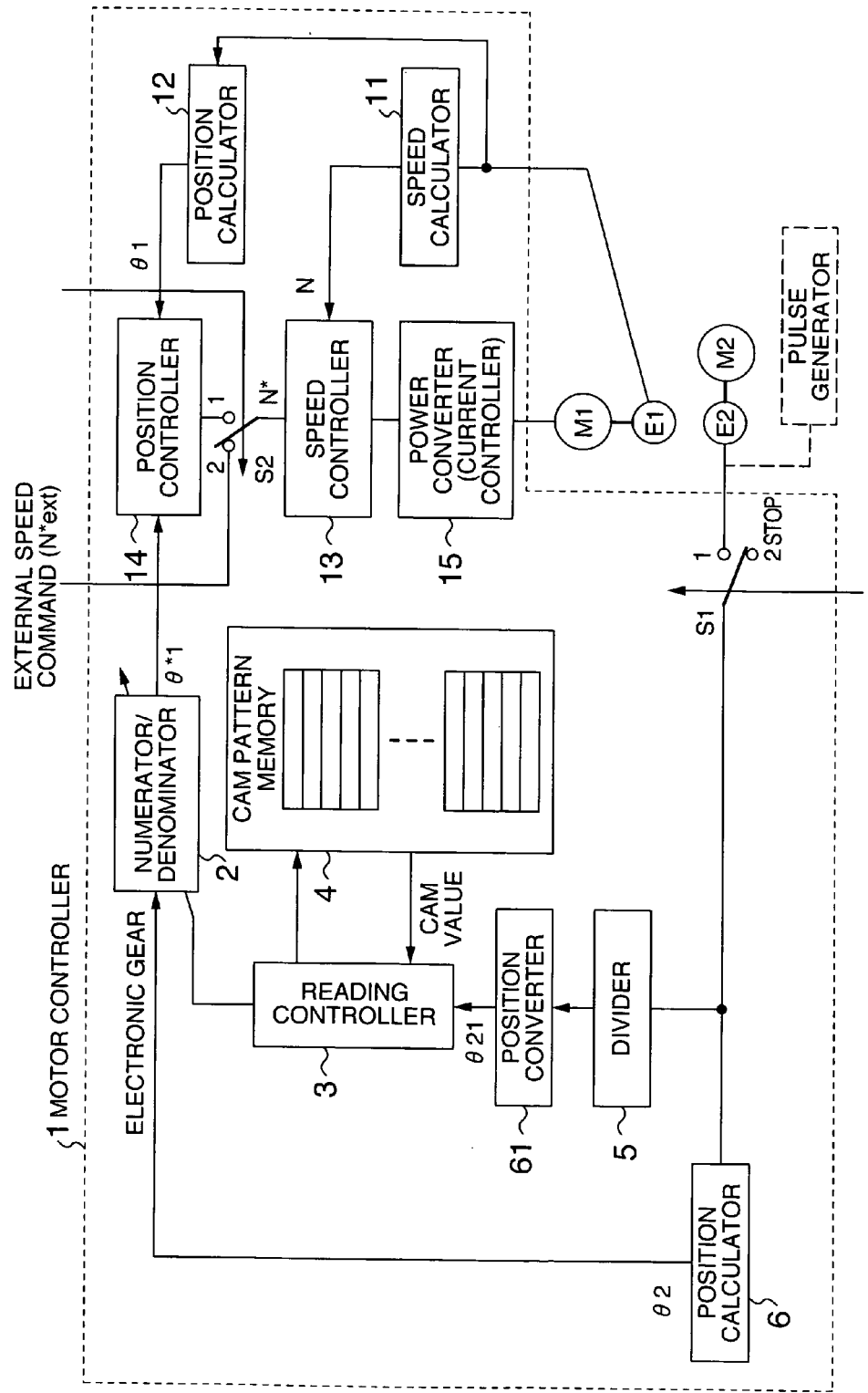
FIG. 1 schematically illustrates a motor controller according to an embodiment of the present invention.

Embodiments of the present invention are now described in detail with reference to the accompanying drawings. FIG. 1 schematically illustrates a motor controller according to an embodiment of the present invention. In FIG. 1, a motor M1 is driven by a motor controller 1. An encoder E1 is mounted to the motor and a signal produced by the encoder is supplied to the motor controller 1. The motor controller 1 includes a speed calculator 11, a position calculator 12, a speed controller 13, a position controller 14 and a power calculator 15 (containing a current controller) that constitute a position control system generally well-known. The speed calculator 11 calculates a speed detection value N from an encoder signal inputted from the encoder E1 and supplies it to the speed controller 13. Further, the position calculator 12 calculates a position $\theta 1$ on the basis of the input signal from the encoder E1 and supplies it to the position controller 14.

Figure 2:
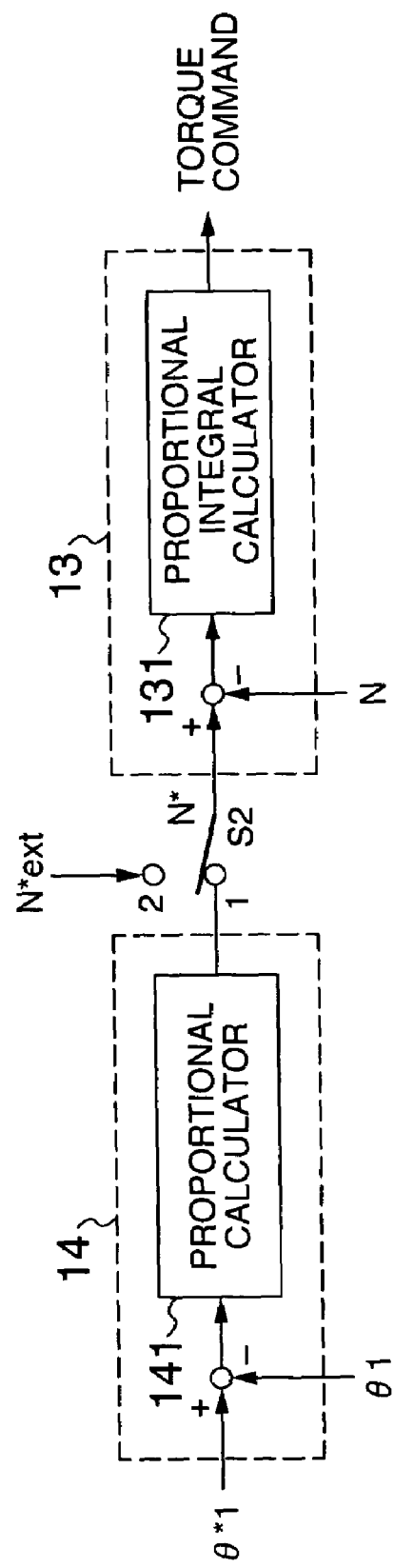
FIG. 2 schematically illustrates a position controller and a speed controller used in the embodiment shown in FIG. 1.

An actual configuration of the position control system is illustrated in FIG. 2. This position control system is a well-known system, which calculates a deviation between a position command $\theta^*1$ and the position $\theta 1$ and supplies it to a proportional calculator 141. A speed command $N^*$ as output of the proportional calculator 141 is supplied to a proportional-integral calculator 131 of the speed controller through a switch S2 (the side of contact 1) and the calculator 131 produces it as a torque command. The switch S2 is configured to be able to input an external speed command $N^*$ext through the side of a contact 2 thereof externally.

The main portion of the embodiment of the present invention is now described. The motor controller of the embodiment further includes an electronic gear 2, a cam pattern memory 4, a reading controller 3 thereof, a divider 5 and position calculators 6, 61. The electronic gear 2 converts an external position command in the ratio of a numerator and a denominator by the electronic gear function as included in a servo-amplifier for usual pulse train and supplies the converted position command to the position controller 14. However, in order to realize the embodiment of the present invention, the electronic gear capable of making the conversion even if the electronic gear ratio (numerator/denominator) is negative is required.

In the embodiment of the present invention, a signal from an external motor M2 or a pulse generator is inputted through a switch S1. This signal is supplied to the position calculator 6, which outputs it as an external position $\theta 2$ to be supplied to the electronic gear 2. In this state, if a value of the electronic gear 2 is fixed, the motor controller constitutes the position control system synchronized with the external position θ2. In the embodiment of the present invention, the signal θ2 inputted through the switch S1 is supplied through the divider 5 and the position calculator 61 to the reading controller 3, as the divided external position θ21. The electronic gear ratio can be varied in accordance with the divided external position θ21 to thereby synchronize the cam with the external position θ2 and control an amount of movement thereof variably. That is, the function of the electronic cam can be realized so that the movement amount is varied in accordance with a distance from the center on the basis of a rotation angle in the same manner as the mechanical cam.

At least one of the numerator and the denominator of the electronic gear 2 may be varied. When the capacity of the cam pattern memory 4 is desired to be reduced, any of the numerator and the denominator of the electronic gear may be provided. Further, in order to realize the smooth electronic cam operation, detailed cam patterns are required to be stored in the cam pattern memory 4, although the external position θ2 can be divided into the divided external position θ21 by the divider 5 to thereby reduce the memory capacity of the cam pattern memory. Further, since the frequency of the divided external position θ21 is lower than that of the external position θ2, it is useful to reduce the processing speed of the circuit or software for processing this part, so that the cost of the position controller 1 can be suppressed.

Figure 3:
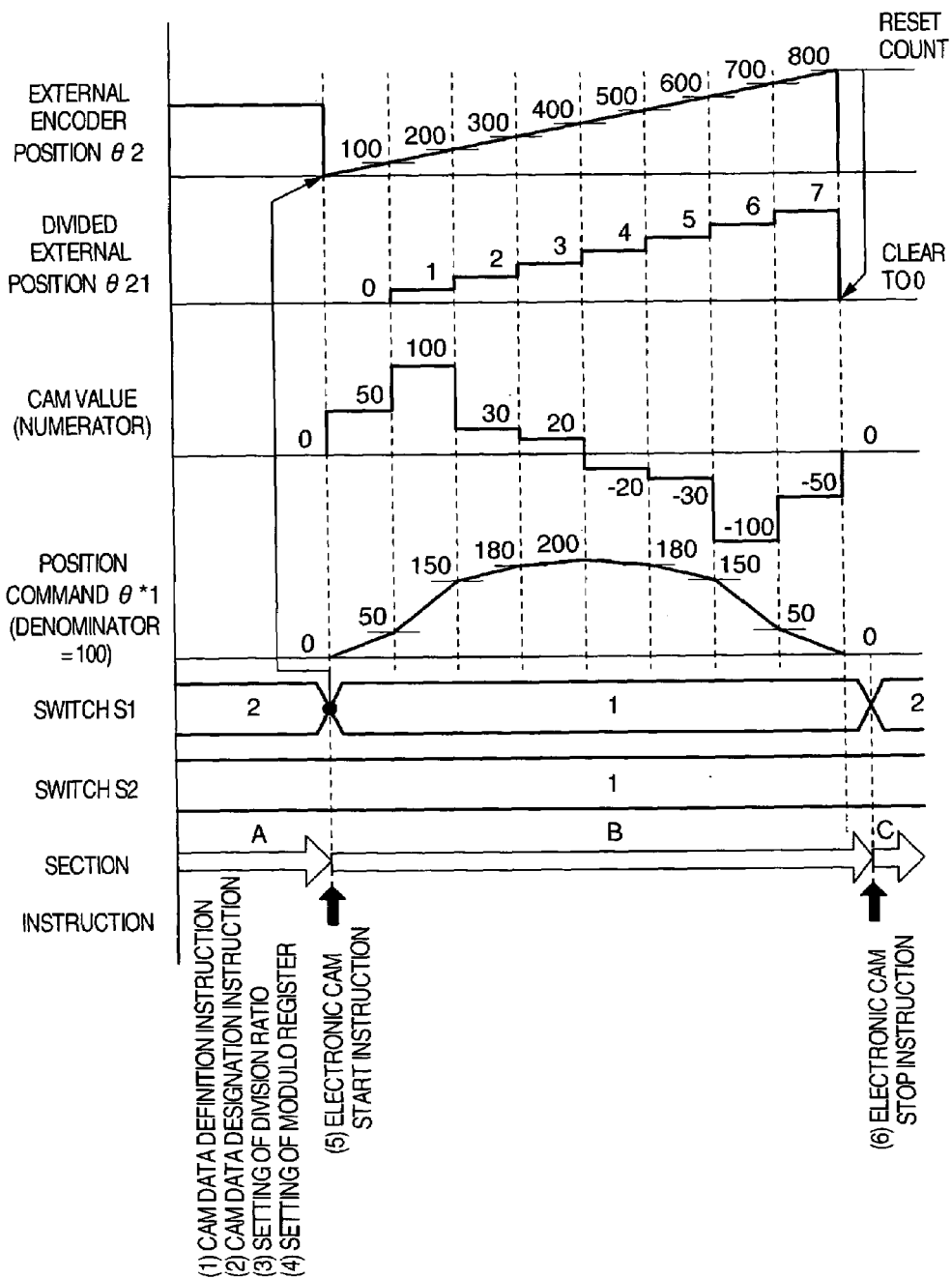
FIG. 3 shows an example of a timing chart of the embodiment.

FIG. 3 shows an example of a timing chart of the embodiment. For the simplification of description, in this case, the denominator of the electronic gear 2 is fixed to 100 and the numerator is varied. It is supposed that when an external motor encoder E2 produces 800 pulses in one pattern, the divider 5 divides the pattern into 8 sections so that the divider 5 divides 800 pulses by 8 into 100 (800/8=100).

The switches S1 and S2 are controlled in the section A of FIG. 3 so that the contacts 1 and 2 thereof are as shown in FIG. 3. Since the switch S1 is switched to the side of the contact 2, the signal from the external encoder E2 is not supplied to the external position calculator 6 and the reading controller 3 and accordingly the external encoder position θ2 is set to be a fixed value as shown in FIG. 3. In this case, the cam value is supposed to be 0.

When this state is then changed to the section B and the switch S1 is changed over to the side of the contact 1, the external encoder position θ2 is cleared to 0 and counting is started. Accordingly, the divided external position θ21 is also varied stepwise as shown in FIG. 3. The reading controller 3 successively reads out the cam values from the cam pattern memory 4 in synchronism with the counting of the divided external position θ21 to vary the numerator of the electronic gear 2. Further, when the external encoder position θ2 reaches 800 corresponding to one pattern, the counter can be cleared to thereby control one period of the pattern.

In the embodiment, 50, 100, 30, 20, −20, −30, −100 and −50 are set as the cam pattern, so that the cam values (the numerators of the electronic gear) are varied as shown in FIG. 3. In this example, since the denominator is set to 100, the electronic gear ratio is varied to 50/100=0.5, 100/100=1.0, 30/100=0.3, 20/100=0.2, −20/100=−0.2, −30/100=−0.3, −100/100=−1.0 and −50/100=−0.5. In this connection, the electronic gear function is required to treat negative values differently from the conventional gear function.

The electronic gear 2 is supplied with the external position θ2 that is not divided and accordingly even when the electronic gear ratio is varied stepwise, the position command θ*1 is automatically interpolated as shown in FIG. 3, so that the electronic gear is operated smoothly. Here, the electronic cam function is required to be operated smoothly, while it is required to pass through points on paths. In this case, if the division ratio is decided to be coincident with the points, the cam pattern for passing through the points can be provided.

Figure 4:
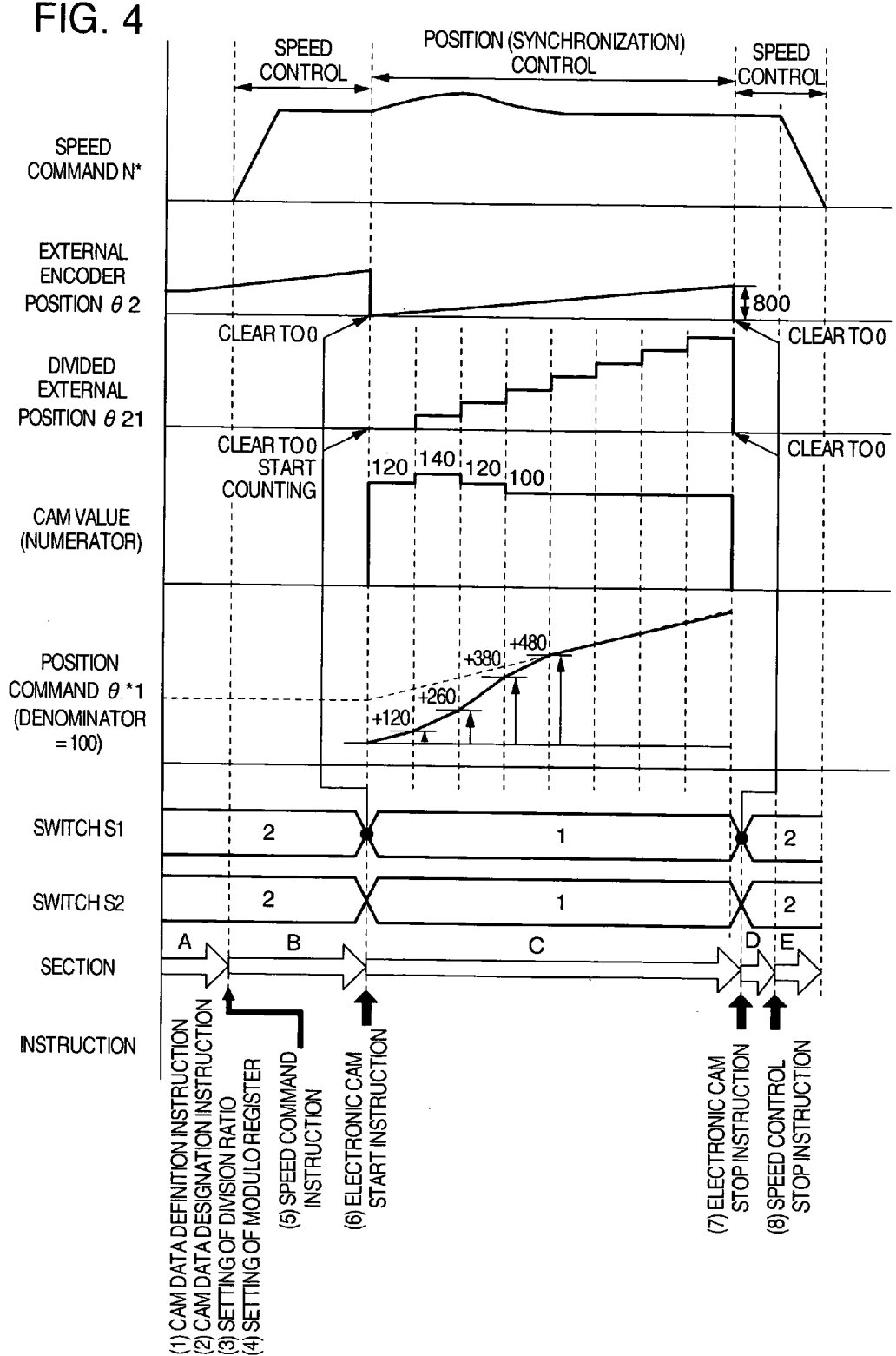
FIG. 4 shows another example of a timing chart of the embodiment.

FIG. 4 is a timing chart showing another utilization method in the circuit configuration shown in FIG. 1. In the embodiment, the electronic cam function is changed during operation. In the section B, the switches S1 and S2 are changed over to the side of the contact 2 and the speed control operation is made in accordance with the external speed command N*ext. In FIG. 4, the external speed command N*ext is supposed to be formed into a trapezoid.

In the section C, the switches S1 and S2 are all changed over to the side of the contact 1 and the speed control operation is changed to the position control operation. The divided external position θ21 produced by the divider 5 is started to be counted from this moment and the cam values are successively read out from the cam pattern memory in synchronism with the counting. In the embodiment, the denominator is fixed to 100 and the cam pattern is set to 100, 120, 140, 120 and 100. In the previous example, the electronic gear is also required to treat negative values, while in the embodiment the electronic gear is not required to treat negative values specifically and is sufficient to have the general electronic gear function.

The position command θ*1 is varied as shown in FIG. 4 in accordance with the cam pattern. When the cam pattern is set to only 100, a fixed positional deviation (delay) occurs upon change to the section C, although when a large cam pattern value is provided at the start portion as shown in the embodiment, the delay can be corrected (the colored portion of the cam value in FIG. 4). Accordingly, in the embodiment, positioning can be made to an object being moved by a belt conveyor or the like and delay can be corrected.

In the sections D and E of the embodiment, the switches are returned to the original contact side to be changed to the speed control operation. At this time, the divided external position θ21 is cleared. In FIG. 4, the external speed command N*ext is given to reduce the speed as shown in FIG. 4 and the motor is stopped.

Figure 5:
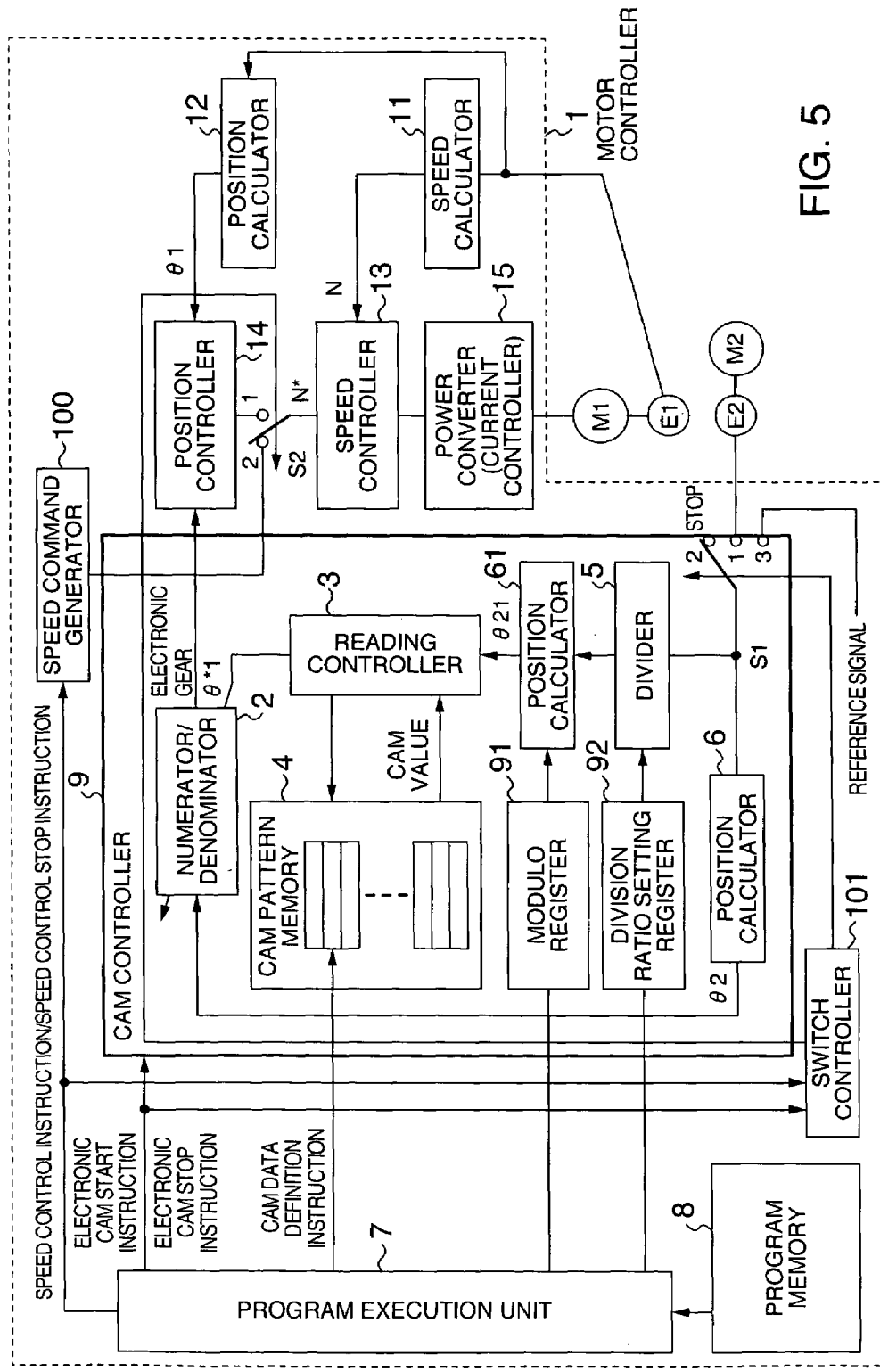
FIG. 5 schematically illustrates a motor controller according to another embodiment of the present invention.

FIG. 5 schematically illustrates a motor controller according to another embodiment of the present invention. Since the electronic cam function according to the embodiment of the present invention is simplified as compared with the conventional cam function, the function of the higher-rank controller can be incorporated into the motor controller. In the embodiment, the user can describe the function of the higher-rank controller in a program. The motor controller 1 includes the function of programs. Accordingly, in this example, a program execution unit 7 and a program memory 8 are added in the motor controller. A user program is stored in the program memory 8 and is successively read out from the program memory 8 to be decoded and executed by the program execution unit 7. Accordingly, the motor controller 1 is realized in software.

In FIG. 5, the cam control mechanism of the embodiment of the present invention is shown as a cam controller 9, which includes the switches S1 and S2, the electronic gear 2, the reading controller 3, the cam pattern memory 4, the divider 5 and the position calculators 6, 61 and the operation thereof is the same as described above. However, the switches S1 and S2 are not controlled externally and are controlled by instructions of the program. The cam pattern memory 4 is shown separately from the program memory 8, while when the motor controller 1 is constituted in software, the cam pattern memory 4 and the program memory 8 can be constituted by the same memory to thereby reduce the cost of the system.

In the above embodiments, since the electronic gear function and the divider can be included in an inexpensive servo-amplifier and the electronic cam function is realized by means of the servo-amplifier, the inexpensive and intelligent system can be realized. Further, since the divider is included in the servo-amplifier, the number of data and the reading frequency of the cam pattern can be decreased and accordingly the inexpensive system can be realized.

Further, since the operation of the system can be described in programs, the operation of the system can be modified flexibly.

As an example for realizing the contents of the embodiment of the present invention, program instructions and setting registers may be provided as follows.

The above processing is to be executed by at least the program instructions for instructing the cam operation control for the processing and the controller for executing the program instructions.

Further, the program instructions may include instructions for instructing operation of the operation units in the motor controller such as the reading controller, the position controller, the speed controller and the power converter and the controller for executing the program instructions may control the operation units in the motor controller such as the reading controller, the position controller, the speed controller and the power converter.

The embodiment is an example and the present invention is not limited thereto. Even when the embodiment is improved and modified properly, the same effects can be attained.

Speed control instruction generates a trapezoid-formed speed pattern and controls the speed at a fixed speed. This instruction changes over the switches S1 and S2 to the side of contact 2.

Speed control stop instruction starts to reduce the speed from the fixed speed to 0.

Electronic cam start instruction starts operation with the electronic cam function. This instruction changes over the switches S1 and S2 to the side of contact 1.

Electronic cam stop instruction stops the operation with the electronic cam function. This instruction changes over the switches S1 and S2 to the sides of contact 2 and contact 1, respectively.

Cam data definition instruction defines cam data (defines the kinds of the cam data individually).

Cam data designation instruction designates which of the defined cam data is selected.

The division ratio of the divider is set in a division ratio setting register.

A reset value of $\theta 2$ is set in a modulo register.

To this end, the modulo register 91 and the division ratio setting register 92 are provided in the cam controller 9. Further, a switch controller 101 is provided to control the switches S1 and S2. Moreover, in order to realize the embodiment of FIG. 4, a speed command generator 100 for generating the speed command is required to be provided in the motor controller 1 instead of generating it externally. However, if these elements are realized in software, the cost is not increased.

The operation procedure of the program instructions in case where the embodiment of FIGS. 3 and 4 is realized is now described. Execution states of the instructions are shown in the lower part of FIG. 3. In the section A, (1) the cam data definition instruction is executed, (2) the cam data designation instruction is executed, (3) the division ratio is set in the division ratio setting register (in this example, 100 is set) and (4) a value is set in modulo register (in this example, 800 is set). (5) The electronic cam start instruction is executed to thereby change over from the section A to the section B and control the switches S1 and S2 to be as shown in FIG. 3. When the external encoder position $\theta 2$ reaches the value set in the modulo register, the positions $\theta 2$ and 021 are cleared and the cam value is reset to 0. Thereafter, (6) the electronic cam operation is stopped by the electronic cam stop instruction to thereby move to the section C.

The embodiment of FIG. 4 is now described. In the section A, (1) the cam data definition instruction is executed, (2) the cam data designation instruction is executed, (3) the division ratio is set in the division radio setting register (in this example, 100 is set) and (4) a value is set in the modulo register (in this example, 800 is set). (5) The speed control instruction is then executed to start the trapezoid-formed speed control. In the section B, (6) the electronic cam start instruction is executed in response to an external signal or the like to change over from the section B to the section C and control the switches S1 and S2 to be as shown in FIG. 4, so that the synchronous operation is performed as shown in FIG. 4. When the synchronous operation does not need to be performed, (7) the electronic cam stop instruction is executed and the synchronous operation is canceled in the section D. Further, the speed control stop instruction is executed to reduce the operation speed and then stop the operation in the section E.

In FIG. 5, a contact 3 is added to the switch S1, while a reference signal is supplied to the motor controller 1 through the contact 3 of the switch S1 instead of the external encoder E2, so that the external encoder E2 is not required to be provided externally to thereby reduce the cost.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A motor controller including:
   an electronic gear part for producing a position command signal multiplied by any gear ratio; and
   a power converter for controlling a motor on the basis of the position command signal,
   the motor controller comprising:
   a first position calculator for converting an externally inputted signal into an external position signal;
   a divider for dividing the externally inputted signal;
   a second position calculator for converting an output of the divider into a divided external position signal;
   a cam pattern memory for storing cam patterns; and
   a reading controller for reading out a cam pattern corresponding to the divided external position signal from the cam pattern memory,
   wherein the read-out cam pattern being used as a gear ratio and a cam operation of the motor is controlled by a position control signal produced by the electronic gear part on the basis of the external position signal and the gear ratio by the read-out cam pattern.

2. The motor controller according to claim 1, wherein
   at least one of a numerator and a denominator of the electronic gear is varied in accordance with the read-out cam pattern to thereby provide an electronic cam function synchronized with the external inputted signal.

3. The motor controller according to claim 1, wherein the cam pattern from the cam pattern memory or synchronization with the external inputted signal is read after a cam operation start signal is inputted externally.

4. The motor controller according to claim 1, wherein a read-out data position, in which the cam pattern from the cam pattern memory is read, is reset to a data start position of the cam pattern when final data of the cam pattern is read out or when a externally set number of read data is exceeded.

5. The motor controller according to claim 1, wherein the externally inputted signal is changed over to an internal signal in the motor controller.

6. The motor controller according to claim 1, further comprising:
   a position controller for controlling a position; and
   a speed controller supplied with an output from the position controller as a speed command,
   wherein the speed command and an external speed command are changed over.

7. The motor controller according to claim 1, wherein the cam operation of the motor is controlled by a program instruction and a controller for executing the program instruction.

* * * * *